(12) United States Patent
Arai

(10) Patent No.: US 7,559,982 B2
(45) Date of Patent: Jul. 14, 2009

(54) DUST COLLECTOR

(75) Inventor: Takeshi Arai, Yokohama (JP)

(73) Assignee: Kabushiki Kaisha YMS (JP)

( * ) Notice: Subject to any disclaimer, the term of this patent is extended or adjusted under 35 U.S.C. 154(b) by 602 days.

(21) Appl. No.: 10/508,344

(22) PCT Filed: Mar. 26, 2003

(86) PCT No.: PCT/JP03/03833

§ 371 (c)(1),
(2), (4) Date: Jun. 28, 2005

(87) PCT Pub. No.: WO03/084642

PCT Pub. Date: Oct. 16, 2003

(65) Prior Publication Data

US 2006/0162568 A1 Jul. 27, 2006

(30) Foreign Application Priority Data

Apr. 4, 2002 (JP) ............................. 2002-102221

(51) Int. Cl.
*B01D 47/00* (2006.01)
(52) U.S. Cl. ............................. 96/321; 96/272; 96/316; 96/356; 96/361; 95/214; 95/219
(58) Field of Classification Search .................. 96/314, 96/316, 272, 321, 355, 361, 356; 55/413, 55/414, 416, 426; 95/214, 219
See application file for complete search history.

(56) References Cited

U.S. PATENT DOCUMENTS 3,852,409 A * 12/1974 Martin et al. .......... 423/243.08
3,989,488 A * 11/1976 Wisting ........................ 96/237
4,120,670 A * 10/1978 Pircon ........................... 95/216
4,319,897 A * 3/1982 Labadie ........................ 55/302
4,734,109 A * 3/1988 Cox ............................. 95/189
4,786,293 A * 11/1988 Labadie ......................... 95/20
4,948,396 A * 8/1990 Barnes et al. ................. 95/219
5,209,766 A * 5/1993 Reither ......................... 96/265
7,115,150 B2 * 10/2006 Johnson et al. ............... 55/486

* cited by examiner

*Primary Examiner*—Duane Smith
*Assistant Examiner*—Ives Wu
(74) *Attorney, Agent, or Firm*—Bacon & Thomas, PLLC

(57) ABSTRACT

A dust collector (10) has a main body (12), the interior of which is divided by a tubular partition wall (26) into a central filtration chamber (30) and an outwardly-located annular cyclone chamber (32). At the upper part of the cyclone chamber (32), there is provided a water supply pipe (36) having radially directed nozzles (38) adapted to form a water film flowing down along the inner circumferential surface of the main body (12) and the outer circumferential surface of the partition wall (26), respectively. Air to be treated is drawn under suction through an air intake (34) into the cyclone chamber (32) and swirling air is brought into contact with the water film whereby dust and particles are preliminarily collected while retaining an explosion-proof function. The cyclone chamber (32) and the filtration chamber (30) are communicated with each other at the lower portion thereof to permit the thus pretreated air to be drawn into the filtration chamber (30). Filters (44) are arranged in the filtration chamber (30) so as to further collect dust and particles by filtration. A small and compact dust collector capable of effectively collecting fine particles and small in air-flow resistance and pressure drop and having an excellent explosion-proof capability can be provided.

15 Claims, 5 Drawing Sheets

DUST COLLECTOR

CROSS-REFERENCE TO RELATED APPLICATIONS

This application is a National Phase Application (35 USC 371) of PCT/JP03/03833 and claims priority of Japanese Application No. 2002-102221, filed Apr. 4, 2002.

FIELD OF THE INVENTION

The present invention relates to improvements in a dust collector for collecting and removing airborne dust and particles contained in dust-laden air or gas.

BACKGROUND OF THE INVENTION

To remove dust-laden air from an ambient atmosphere where dust and particles are generated and to capture and collect the airborne dust and particles, various types of dust collectors have been used which may be grouped into wet-type dust collectors and dry-type dust collectors.

Wet-type dust collectors known in the art include a cyclone scrubber, a leaking shelf washing tower, a venturi scrubber, a packed tower, an impingement scrubber, a water film scrubber, etc.

Generally, these wet-type dust collectors are large in scale, complex in structure, and expensive to build, and in many cases are unable or difficult to transport. Moreover, the threshold particle size of the wet-type dust collectors is generally in the order of micrometers so that they are not suitable to collect more fine particles.

Dry-type dust collectors typically are of the filtration type provided with filters and are adapted to draw dust-laden air by a source of vacuum such as a blower, vacuum pump and ejector and to cause the dust-laden air to pass through the filters to remove the dust and particles by filtration.

In the dust collectors of the filtration type, filters are clogged by dust during use so that it is necessary to cyclically backwash the filters by injecting compressed air. Depending on the nature of the dust and particles, e.g., in the case that the particles are fine or hygroscopic, the air flow resistance across the filters will be undesirably increased even though backwashed very frequently.

Therefore, the present inventor has previously proposed a hybrid-type dust collector wherein a wet-type dust collector structure consisting of a bubbling-type cyclone scrubber is arranged upstream of a filtration stage comprised of filters to ensure that a part of dust and particles in the air to be treated is preliminarily collected by the cyclone scrubber to thereby reduce the load upon the subsequent filtration stage (JP-C-3, 351,735).

The hybrid-type dust collector mentioned has an upright tubular main body closed at both ends, a tubular partition wall of a reduced diameter being concentrically arranged internally of the main body to define a centrally located filtration chamber and an annular cyclone chamber situated outwardly of the filtration chamber. One or more filters are arranged in the filtration chamber and means is provided for applying suction or vacuum to the secondary side of the filters. The main body is provided with an air inlet opening tangentially to the upper part of the cyclone chamber. The lower end of the partition wall is spaced upwardly away from the bottom of the main body so that the filtration chamber and the cyclone chamber are communicated with each other at the lower part thereof. In use, water is introduced onto the bottom of the main body to form a water sump in which the lower end of the partition wall is submerged.

The hybrid-type dust collector just described is designed to particularly process dust-laden moist air containing water vapor in such a manner that, as the dust-laden air is drawn into the cyclone chamber and water droplets are formed by condensation following expansion and cooling of water vapor, the dust and powders in the dust-laden air are captured and collected in the primary step by impinging upon the inner wall of the cyclone chamber together with the water droplets. The dust and powders are further collected in the secondary step by the air-to-liquid contact carried out during bubbling as air is caused to submerge into the water sump as it passes the lower end of the partition wall. The dust and particles are further caught in the final step by the filters.

The dust collector mentioned enjoys the advantage that it is small, compact, simple in structure, and cost effective, because the filtration chamber is located at the center with the cyclone chamber arranged outwardly thereof, and that maintenance thereof is easy because it is washable. Furthermore, the dust collector has an excellent explosion-proof capability because the bubbling-type scrub arrangement acts as a fire wall.

However, under a certain operating conditions, the hybrid-type dust collector involves two problems.

Firstly, since the bubbling-type scrubber is arranged upstream of the filters, fine water droplets generated as air bubbles are burst will be carried by air and will be drawn toward the filters so that the filters will be wetted with water.

When the surface of the filters are wetted with water, the powders and particles collected thereby will, in turn, be wetted with water. As a result, dust and particles thus collected will adhere or stick to the filters so that they will not be dislodged therefrom by backwashing with compressed air. Consequently, filters are clogged with dust causing the air-flow resistance and pressure drop to increase. This will necessitate to increase the output power of the source of vacuum such as a blower of a vacuum pump whereby the running costs and production costs of the system will be augmented.

In particular, in the case where filters for ultra-fine particles capable of collecting particles in the order of submicrons are used, an increase in the air-flow resistance and pressure drop due to wetting will be so high that the running costs and production costs of the system will be prohibitively increased.

Filter wetting due to bubbling will become more dominant as the flow rate and air speed of the dust collector is increased.

Secondly, in the case that airborne dust and particles in the air to be treated are fine and combustible, some explosion-proof measures must be taken in general because the dust-laden air becomes explosive and there is a danger of dust explosion. It is believed that dust explosion is resulted when a minute explosion triggered, for example, by electrostatic spark discharge induces chain explosion of dust deposit. Therefor, formation of dust deposit is most undesirable for dust explosion. In particular, ignition of fine dust and particles may occur even by a smallest energy of spark discharge of electrostatic charges. Furthermore, dust explosion is likely to occur when the air to be treated is dry.

The hybrid-type dust collector described hereinbefore is designed to remove the dust and particles in such a manner that, when the dust-laden air containing water vapor is drawn into the cyclone chamber, water vapor is condensed into water as it is subjected to expansion and cooling, so that the dust and particles, together with the droplets of condensate, are caused to adhere to the inner wall of the cyclone chamber.

Accordingly, this dust collector is not suitable for use in the treatment of explosive, dry dust-laden air. This is because there is a likelihood of the collected dust and particles to deposit onto the inner wall of the cyclone chamber and the air entered through an inlet into the cyclone chamber is directly brought into contact with the dust deposit.

Therefore, when intended for use in the treatment of explosive, dry, dust-laden air, there is a room for the hybrid-type dust collector mentioned to be improved from the view point of explosion-proof capability.

Accordingly, an object of the present invention is to improve the hybrid-type dust collector described in the aforementioned patent and to prevent the filter from being wetted with water to thereby prevent an increase in the air-flow resistance and pressure drop across the filter.

Another object of the invention is to improve the aforementioned hybrid-type dust collector in a manner to enhance the explosion-proof capability.

A still another object of the invention is to provide a hybrid-type dust collector which is small and compact, cost effective and simple in structure, and easy to maintain, while achieving the foregoing objects.

DISCLOSURE OF THE INVENTION

This invention provides a dust collector comprising an upright tubular main body closed at both ends and a tubular partition wall of a reduced diameter concentrically arranged internally of said main body to define a centrally located filtration chamber and an annular cyclone chamber situated outwardly of said filtration chamber, the lower edge of said partition wall terminating upwardly away from the bottom of said main body so that said filtration chamber and said cyclone chamber are communicated with each other at the lower part thereof, said dust collector further comprising a filter arranged in said filtration chamber and means for applying suction or vacuum to the secondary side of said filter, said main body being provided with an air inlet opening tangentially to the upper part of said cyclone chamber and a drain opening located at the bottom thereof.

According to the invention, the dust collector includes spray means, provided at the upper part of said cyclone chamber, for forming a film of water flowing down along the inner circumferential surface of said main body and the outer circumferential surface of said partition wall, respectively, to ensure that a swirling stream of air to be treated drawn through said air inlet into said cyclone chamber is brought into contact with said water film to thereby cause airborne dust and particles in the air to be treated to be captured therein and to cause captured dust and particles to be washed away. The spray means is in the form of an annular member with a plurality of nozzles which spray the water horizontally onto the inner circumferential surface of the main body and onto the outer circumferential surface of the partition wall, thereby wetting the inner circumferential surface and the outer circumferential surface 360 degrees around. The air inlet is located below and spaced from the spray means.

With this arrangement, as the dust collector according to the invention is not equipped with a bubbling-type scrubber and because collection of dust by way of air-to-liquid contact and impingement is carried out by the water film flowing down along the inner circumferential surface of the main body and the outer circumferential surface of the tubular partition wall, respectively, without involving formation of water spray or splash, it is possible to avoid filter being wetted with water so that any increase in the air-flow resistance and pressure drop across the filter can be prevented.

In addition, as in the dust collector according to the invention the dust and particles collected by the water film are not only wetted with water but are constantly washed away by the water film, there is no place for dust and particles to deposit in a dry condition. As a result, according to the invention, explosion-proof capability of the dust collector is extremely enhanced.

In a preferred embodiment, means for forming a film of water comprises an annular water supply means for spraying water toward the upper part of the inner circumferential surface of the main body and the outer circumferential surface of the partition wall.

When the airflow rate through the dust collector is increased, the speed of air streams swirling within the cyclone chamber will be increased. This would give rise to the problem that there is a risk of water droplets to be splashed and that water flowed down to the bottom of the main body is subjected to the centrifugal force to form eddy current which would render drainage of water difficult.

In a preferred embodiment, therefore, a plurality of flow straightening fins are provided between the lower part of the partition wall and the main body to dampen or prevent air stream, as well as water flowing down along the inner circumferential surface of the main body and the outer circumferential surface of the partition wall, from swirling at the bottom of the cyclone chamber.

Preferably, these flow straightening fins are arranged radially and vertically and are provided each with a portion that extends along the bottom surface of the main body.

In an alternative embodiment, one or more outwardly open supplemental drain openings are provided at the lower part or bottom of the main body to ensure that drainage of water is carried out smoothly by resorting to the centrifugal force of the eddy current.

These features and advantages of the invention, as well as other features and advantages thereof, will become apparent from the following description.

DESCRIPTION OF THE PREFERRED EMBODIMENTS

Embodiments of the dust collector according to the invention will now be described with reference to the accompanying drawings.

Figure 1:
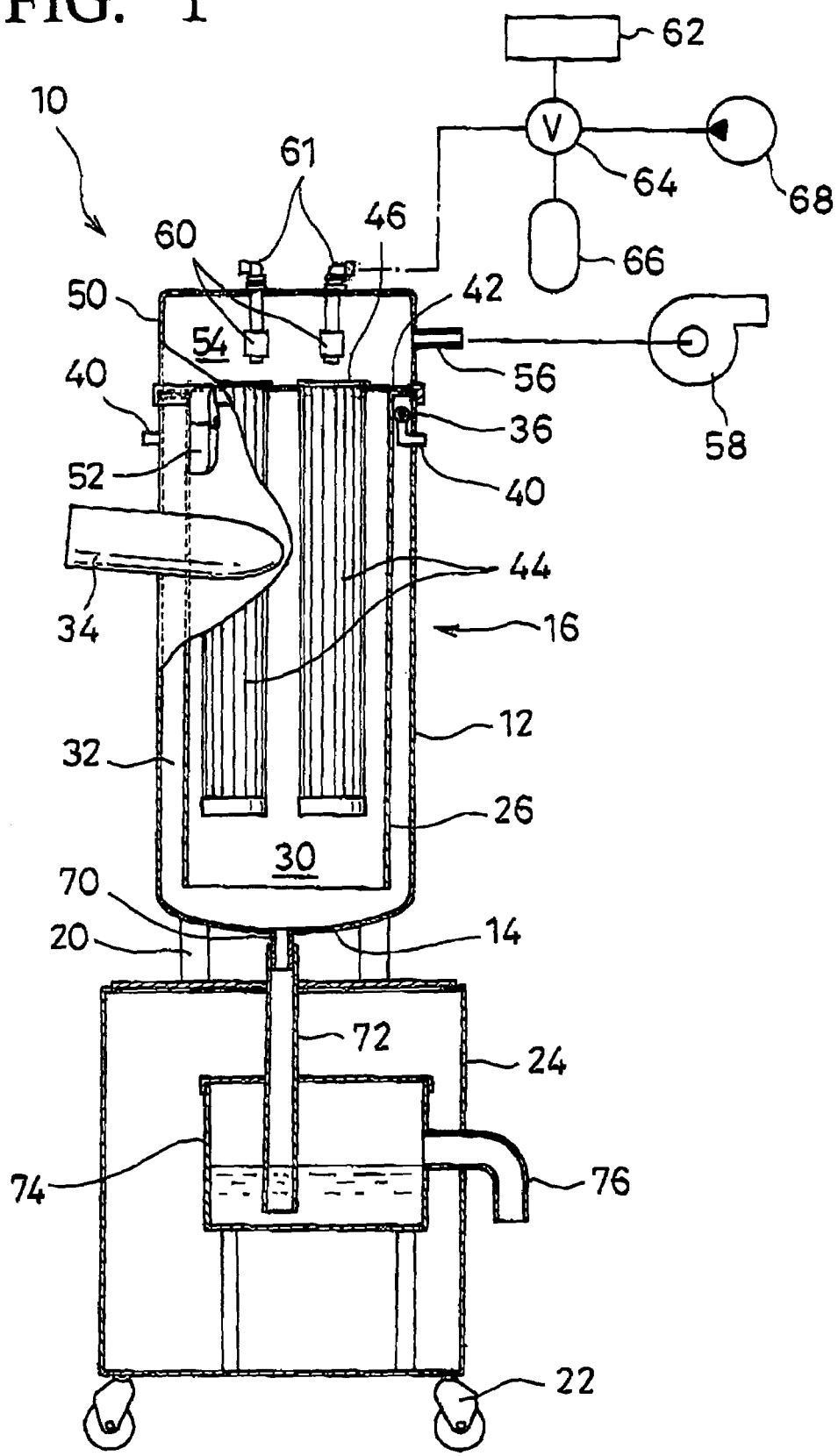
FIG. 1 is a cross-sectional view of an embodiment of the dust collector according to the invention, with certain peripheral devices being shown only schematically.
Figure 2:
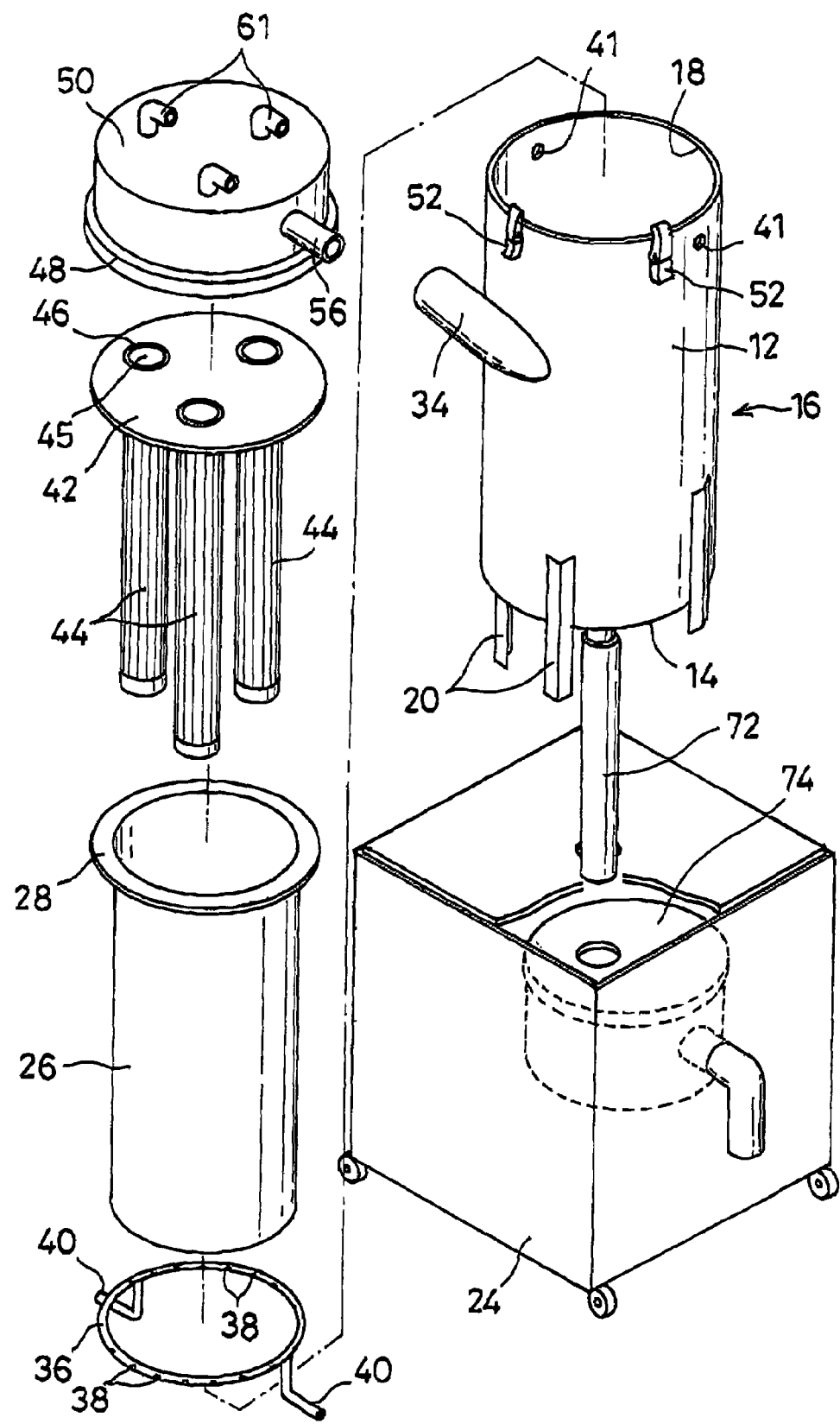
FIG. 2 is an exploded perspective view of the dust collector shown in FIG. 1.

Referring to FIGS. 1 and 2, the dust collector 10 includes a main body 16 having a tubular body or drum 12 and a concave bottom 14, the drum 12 having a circular upper opening 18. The main body 16 may be made from a stainless steel plate.

The main body 16 may be mounted by means of four legs 20, for example, on a base 24 provided with wheeled casters 22.

Arranged concentrically within the main body 16 is a tubular partition wall 26 having a diameter and an axial length smaller than those of the drum 12, respectively, and made, for example, of a stainless steel plate, a flange 28 of the partition wall 26 being adapted to rest upon the upper edge of the drum 12. The inner space of the tubular partition wall 26 serves as a filtration chamber 30 and the annular space between the drum 12 and the tubular partition wall 26 serves as a cyclone chamber 32.

As the tubular partition wall 26 is shorter than the drum 12, the lower edge of the partition wall 26 will be spaced upwardly away from the bottom wall 14 of the main body 16 so that the filtration chamber 30 and the cyclone chamber 32 are communicated with each other at the lower part thereof.

The drum 12 is provided with an air intake tube 34 opening tangentially to the cyclone chamber 32 in such a manner that a swirling air stream is generated within the cyclone chamber 32 as the air is drawn into the cyclone chamber 32 through the air intake 34, as described later. The air intake 34 may be connected to a duct, not shown, extending from an ambient atmosphere where dust and powders are originated, to thereby evacuate by suction the dust-laden air from the atmosphere.

At the upper part of the cyclone chamber 32, there is arranged an annular water supply pipe 36. The water supply pipe 36 is provided with a series of water supply nozzles 38 which are directed in a radial direction toward the inner circumferential surface of the drum 12 and the outer circumferential surface of the tubular partition wall 26 in such a manner that water is sprayed onto these surfaces to thereby form a film of water flowing down along the inner circumferential surface of the drum 12 and the outer circumferential surface of the tubular partition wall 26, respectively.

Water supply nozzles 38 are directed horizontally toward the inner circumferential surface of the drum 12 and the outer circumferential surface of the tubular partition wall 26 to ensure that substantially all the amount of water sprayed through these nozzles is impinged onto the inner circumferential surface of the drum 12 and the outer circumferential surface of the tubular partition wall 26 and is consumed for the formation of water film. This is to avoid that water sprayed through the nozzles 38 is allowed to fall down like rain shower through and within the cyclone chamber 32, and to thus avoid formation of mist or spray in the air stream swirling within the cyclone chamber 32.

The water supply pipe 36 is provided with a pair of water supply elbows 40, for example, which may be connected by a hose, not shown, to a water tap or a source of water under pressure. The water supply pipe 36 may be secured to the drum 12 by passing the elbows 40 through openings 41 formed across the wall of the drum 12 of the main body.

In a manner to rest upon the flange 28 of the partition wall 26, there is arranged a filter support plate 42 having three circular openings, for example, which are circumferentially equally spaced apart from each other. In each of the openings of the filter support plate 42, there is disposed a filter element 44 which is mounted exchangeably and air tightly on the filter support plate 42 by placing an upper flange 46 thereof on the filter support plate 42 and by bringing the flange 46 into tight contact with the filter support plate 42.

Each of the filter elements 44 is of the conventional type having a plurality of pleats and made in the form of a hollow tube closed at the lower end, with the upper opening 45 thereof being opened upwardly. The filter elements 44 are preferably made of ultra-fine filtration material adapted to catch and collect ultra-fine particles having a particle size in the order, for example, of submicrons.

A top cover 50 with a flange 48 is mounted over the filter support plate 42. The top cover 50 is detachably and airtightly secured to the main body 16, with the flange 28 of the partition wall 26, the outer edge of the filter support plate 36 and a sealing gasket (not shown) sandwiched between the flange 48 thereof and the upper edge of the drum 12 of the main body 16, and by clamping the flange 48 against the upper edge of the drum 12 by means of four buckles 52, for example, mounted to the upper part of the drum 12.

The inner space 54 of the top cover 50 serves as a secondary chamber for the filter elements 44 as well as a backwashing chamber wherein filter backwashing valves are received.

To this end, the top cover 50 is provided with a suction inlet 56, forming means for applying suction, which is connected to a source of suction 58 such as a turbo-blower or vacuum pump to apply a suction or vacuum to the secondary chamber 54 to thereby cause air within the filtration chamber 30 to pass under suction through the filter elements 44 causing the dust and powders filtered.

Further, within the top cover 50, there are mounted backwashing valves 60, equal in number to the filter elements, which are arranged, respectively, opposite to the upper openings 45 of the associated filter elements 44, the backwashing valves 60 being adapted to backwash the filter elements 44 in the conventional manner by cyclically injecting pulses of compressed air toward the inner side of the filter elements 44. The backwashing valves 60 may be comprised of the conventional quick exhaust valves.

Each backwashing valve 60 is connected through an elbow 61 to a master valve 64 which is controlled by a control unit 62 and connected to a common accumulator 66 and a source of compressed air such as an air compressor 68.

As long as the signal pressure applied from the master valve 64 to the quick exhaust valve 60 is high, compressed air from the source of compressed air will be accumulated in the accumulator 66. However, when the signal pressure is lowered or shut off, the quick exhaust valve 60 will quickly release the accumulator 66 causing compressed air to be injected toward the associated filter element 44 to thereby perform backwashing of the filter element 44. Backwashing of three filter elements 44 may be carried out alternately.

The bottom wall 14 of the main body 16 is provided at its center with a drain pipe 70 to discharge water sprayed from the water supply pipe 36 and flowed down to the bottom wall 14. A hose 72 is connected to the drain pipe 70 and the lower end of the hose 72 is inserted deeply into an overflow tank 74 mounted on the base 24. The overflow tank 74 is provided with an overflow pipe 76 to ensure that water is always kept in the overflow tank 74 up to the level of the overflow pipe 76. Thus, the drain pipe 70 is water-sealed by means of water kept in this manner in the overflow tank 74.

Next, the mode of use and operation of the dust collector 10 will be described. The air intake 34 of the dust collector 10 is connected to a duct, not shown, laid up to an ambient atmosphere where dust and powders are generated, so that dust-laden air or gas is evacuated from the dust generating atmosphere.

As water feed to the water supply pipe 36 is commenced, water issuing from the water supply nozzles 38 is sprayed over the inner circumferential surface of the drum 12 and the outer circumferential surface of the tubular partition wall 26 whereby a film of water is formed to flow down along these circumferential surfaces, respectively.

Upon operation of the turbo-blower 58, a suction or vacuum will be applied in the inner space 54 of the top cover 50, whereupon the dust-laden air at the dust generating atmosphere will be drawn through the duct, air intake 34, cyclone chamber 32, filtration chamber 30, filter elements 44, and secondary chamber 54, in the sequence mentioned.

As the air intake 34 is positioned tangentially to the cyclone chamber 32, air drawn into the cyclone chamber 32 will form therein a swirling air stream which will be brought into contact with the water film flowing down along the inner circumferential surface of the drum 12 and the outer circumferential surface of the tubular partition wall 26 whereby most of the dust and powders in the air to be treated will be caught by the water film upon impingement.

The water film that has captured the dust and powders will be dragged by the swirling air stream to rotate in a spiral fashion as it flows down along the inner circumferential surface of the drum 12 and the outer circumferential surface of the tubular partition wall 26, and will be discharged through the drain pipe 70 and the hose 72 into the overflow tank 74. As long as the dust collector 10 is operated, the water level in the hose 72 will be kept higher than the level of the overflow pipe 76 under the action of the vacuum in the main body 16, so that the drain pipe 70 and the hose 72 is water-sealed.

As air incoming through the air intake 34 into the cyclone chamber 32 is brought into contact with the water film on the inner circumferential surface of the drum 12 and the outer circumferential surface of the tubular partition wall 26, and because the dust and powders collected on these surfaces are constantly washed away by the water film flowing down therealong, there is no likelihood of electrostatic spark discharge to occur and of ignition of deposited dust to occur, even though the dust and powders borne in the air to be treated would have been electrostatically charged during pneumatic transfer. Accordingly, the dust collector according to the invention provides au extremely enhanced explosion-proof capability.

Air to be treated which has been subjected in this way to pretreatment within the cyclone chamber 32 is then drawn into the filtration chamber 30 and is further subjected to filtration by the ultra-fine filter elements 44 whereby sine dust and particles are effectively collected.

The filter elements 44 are cyclically and alternately backwashed by the backwashing valves 60 in a manner well-known in the field of dust collector so as to regenerate the filtration function thereof.

It will be noted that, in the dust collector 10 according to the invention, there is no need to provide a bubbling-type scrubber between the cyclone chamber 32 and the filtration chamber 30, because collection of dust by way of air-to-liquid contact is done by the water film flowing down along the inner circumferential surface of the drum 12 and the outer circumferential surface of the tubular partition wall 26. Therefore, it is possible to avoid that the filter elements 44 are undesirably wetted with water due to bubbling.

Accordingly, it is possible to prevent an increase in the air-flow resistance and pressure drop across the filter elements 44, as well as to limit the running costs and production costs of the system by operating the dust collector 10 with a blower of limited power.

In order to make the dust collector compact, it is preferable to minimize the diameter of the main body 16, partition wall 26 and filter elements 44 as far as possible. However, if in this way the diameter of the component parts is minimized, and when the flow rate of the blower 68 is increased so as to increase the flow rate of ventilation from the atmosphere where dust and powders are generated, the speed of air flowing through the dust collector 10 and the speed of swirling air stream within the cyclone chamber 32 must, in turn, be increased. This would give rise to several problems.

Figure 3A:
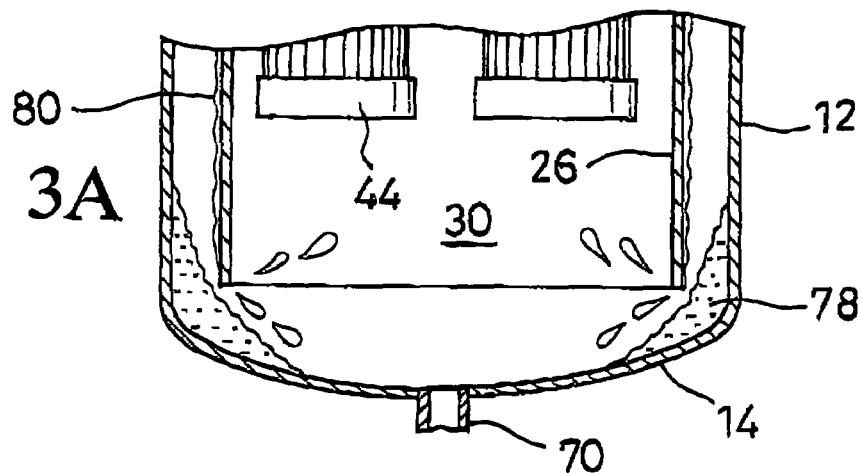
FIG. 3A is a cross-sectional view of the lower portion of the body of the dust collector shown in FIG. 1, with FIGS. 3B and 3C showing the similar portions provided with flow straightening fins.

More specifically, referring to FIG. 3A, as the speed of swirling air stream within the cyclone chamber 32 is increased in response to an increase in the flow rate of the blower 68, the circumferential speed of water, flowed down to the bottom 14 of the main body 16 and caused to swirl by being dragged by the swirling air stream, will be increased so that eddy current 78 circling around the drain pipe 70 will be produced. As the surface of eddy current 78 is agitated and waved by the air stream causing droplets of water to splash, the splashed droplets will be blown upwardly toward the filter elements 44 by being carried by the swirling air stream drawn from the cyclone chamber 32 to the filtration chamber 30, whereby the filter elements 44 would be undesirably wetted.

Furthermore, when the water film 80, having flowed down along the outer surface of the tubular partition wall 26 while rotating spirally, has come to leave the lower edge of the tubular partition wall 26, water will be carried away by the swirling air streams to form splash of droplets as shown in FIG. 3A, which will then be blown up toward the filter elements 44 to similarly wet the elements.

Moreover, due to the centrifugal force acting thereon, the eddy current 78 will be shifted sideways and upwardly away from the drain opening 70 to the degree that water is no longer drained through the drain opening 70. As a result, the bottom 14 of the main body 16 will be flooded with water whereby the filter elements 44 will be similarly wetted.

Figure 3B:
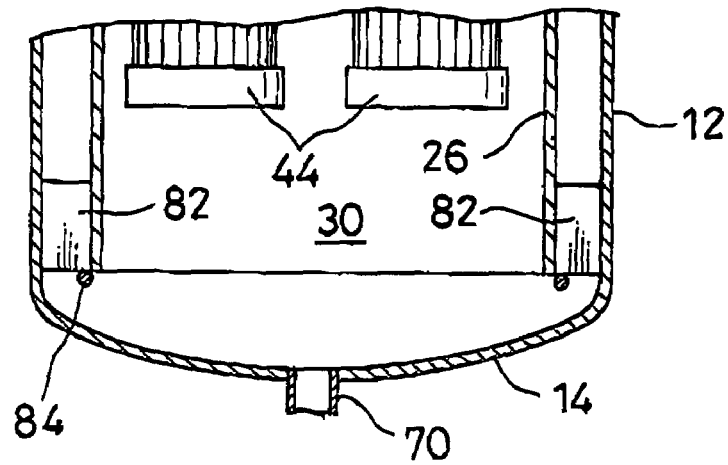

To cope with these problems, it is preferable to arrange a plurality of radially extending, vertical, flow straightening fins 82 between the lower part of the partition wall 26 and the drum 12, as shown in FIG. 3B. As will be understood from FIG. 4A, these flow straightening fins 82 may be secured such as by welding to a support ring 84.

Figure 3C:
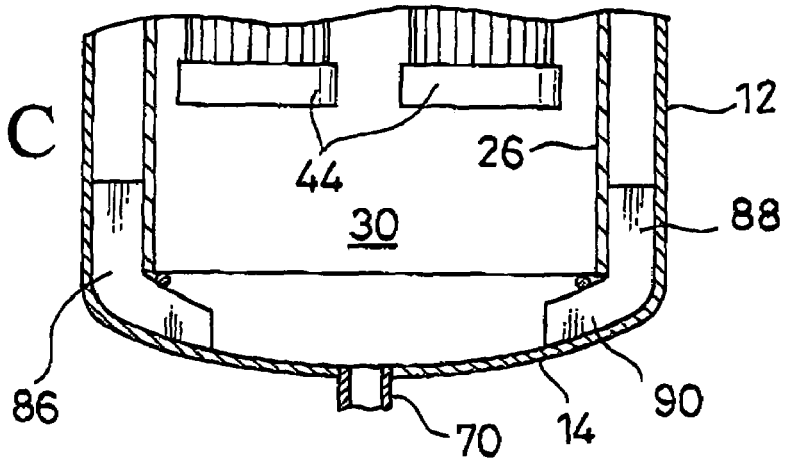
Figure 4:
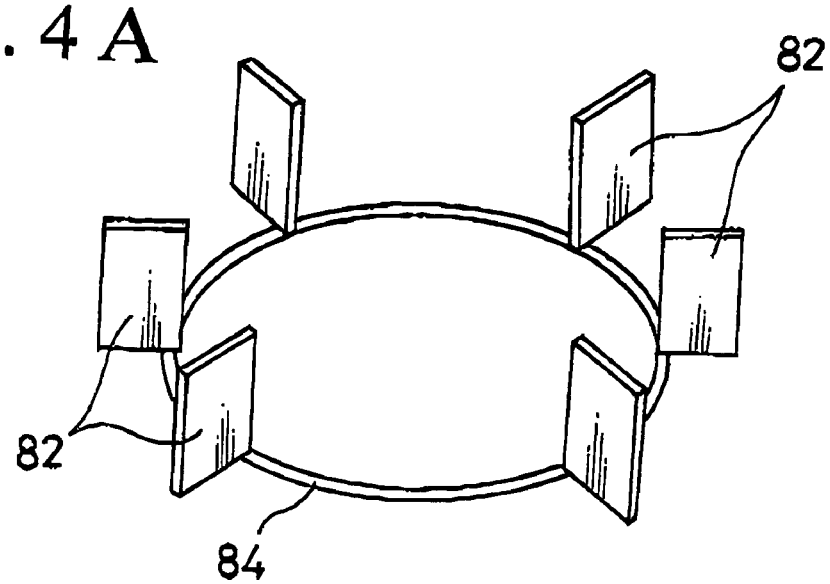
FIGS. 4A and 4B are perspective views of the flow straightening fins shown in FIGS. 3B and 3C, respectively; and, FIG. 5 is a view showing a variant of the body of the dust collector shown in FIG. 1.
Figure 4:
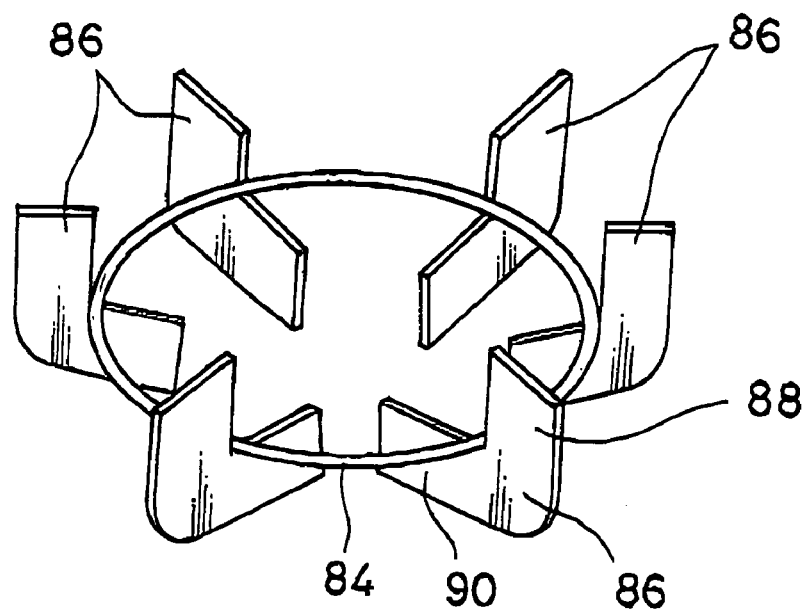

In FIGS. 3C and 4B, there is shown another embodiment of the flow straightening fins. In this embodiment, each of the flow straightening fins 86 comprises a portion 88 situated between the partition wall 26 and the drum 12 and a portion 90 extending along the bottom face of the main body. These flow straightening fins 86 are secured to a common support ring 84 and are positioned in a radial fashion.

These flow straightening fins 82 and 86 act to attenuate and suppress the swirling movement of the air stream and water current that would otherwise occur at the lower portion of the cyclone chamber 32. As a result, generation of the eddy current 78 and formation of wave are prevented so that water is smoothly discharged through the drain port 70.

Furthermore, because of the presence of the flow straightening fins 82 and 66, when the water film flowing down along the outer surface of the tubular partition wall 26 is now to leave the lower edge of the tubular partition wall 26, the water film will be guided by the flow straightening fins to flow smoothly therealong to reach the bottom 14 of the main body 16. Therefore, there is no likelihood of water leaving the lower edge of the partition wall 26 to form splash which would otherwise wet the filter elements 44.

Figure 5:
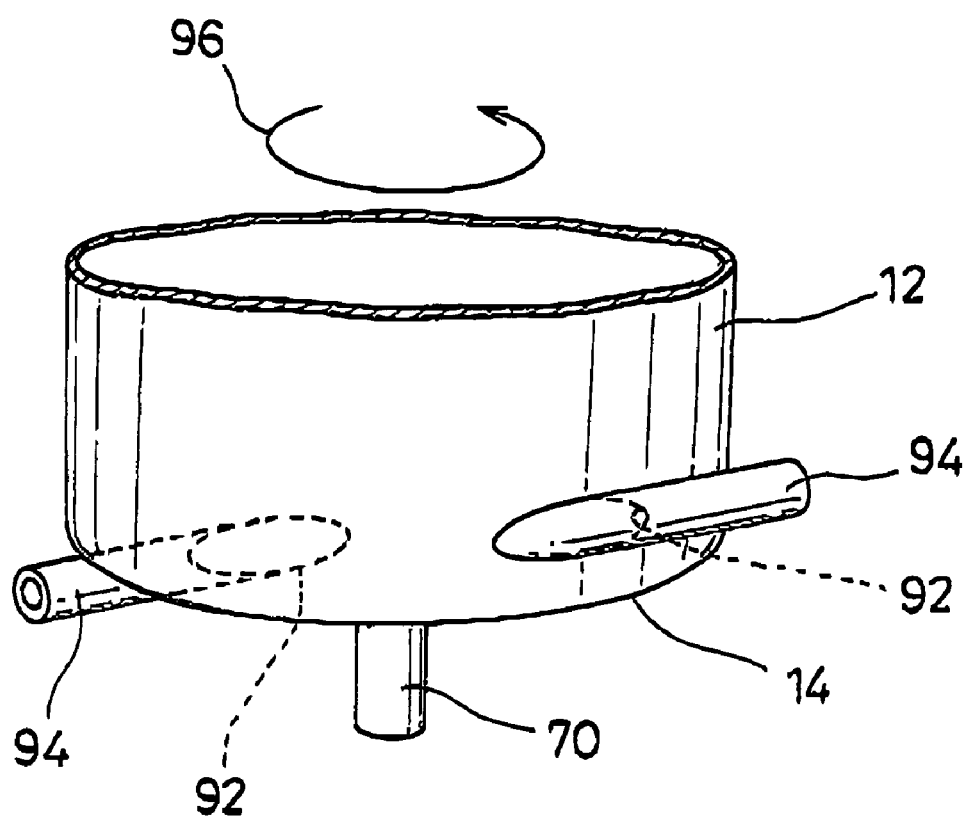

FIG. 5 illustrates a variation of the main body 16 for eliminating or reducing the formation of the eddy current 78 which has been described with reference to FIG. 3A.

In this embodiment, the lower portion of the drum 12 or the bottom wall 14 is provided with one or more, outwardly opened, supplemental drain ports 92 to which drain pipes 94 are connected, respectively. Preferably, the drain ports 92 are elongated tangentially to the drum 12 and the drain pipes 94 are arranged tangentially to the direction of swirling movement of the air stream (shown by the arrow 96) in the cyclone chamber 32. The respective drain pipes 94 may be connected to the overflow tank 74 in a water-sealed relationship in the similar manner as the drain pipe 70.

With such supplemental drain ports 92, water will be drained therethrough under the action of the centrifugal force upon formation of the eddy current 78, so that there is no chance of water to remain on the bottom of the drum 12. Accordingly, any accident that the filter elements 44 are wetted with water can be avoided.

While the present invention has been described herein with reference to the specific embodiments thereof, it is contemplated that the present invention is not limited thereby and various changes and modifications may be made therein. For example, the number of filter elements my be increased or decreased as desired. The top cover may be made shallower or more flat and the secondary chamber for the filters may be provided in the drum of the main body. The supplemental drain pipes may be arranged in a manner to project inside of the main body bottom, the diameter of which may be enlarged in such a manner that the flow speed of the eddy current or the centrifugal force is reduced.

The invention claimed is:

1. A dust collector comprising:
an upright tubular main body closed at top and bottom;
a tubular partition wall of a reduced diameter concentrically arranged internally of said main body to define a centrally located filtration chamber and an annular cyclone chamber situated outwardly of said filtration chamber, the lower edge of said partition wall terminating upwardly away from the bottom of said main body so that said filtration chamber and said cyclone chamber are in communication with each other at a lower part thereof;
a filter arranged in said filtration chamber and made of a filtration material for collecting submicron size particles;
means for applying vacuum to a secondary side of said filter;
an air inlet opening tangentially to an upper part of said cyclone chamber;
a drain opening located at the bottom of the main body;
spray means, provided at the upper part of said cyclone chamber, for forming a film of water flowing down along the inner circumferential surface of said main body and a film of water flowing down along the outer circumferential surface of said partition wall, respectively, to ensure that a swirling stream of air to be treated, drawn through said air inlet into said cyclone chamber, is brought into contact with said water films to thereby cause airborne dust and particles in the air to be treated to be captured therein and to cause captured dust and particles to be washed away, wherein said spray means directs substantially the entire amount of water supplied thereto onto the inner circumferential surface of said main body and the outer circumferential surface of said partition wall whereby said substantially entire amount of water is consumed in the formation of the water films, wherein said spray means is an annular member with a plurality of nozzles which spray the water horizontally onto the inner circumferential surface of said main body and onto the outer circumferential surface of said partition wall, thereby wetting the inner circumferential surface and the outer circumferential surface 360 degrees around; and
wherein said air inlet is located below and spaced from said spray means.

2. A dust collector according to claim 1, wherein said means for forming a film of water comprises an annular water supply means for spraying water toward the uppermost part of the inner circumferential surface of said main body and the outer circumferential surface of said partition wall.

3. A dust collector according to claim 1 further comprising a plurality of flow straightening fins provided between the lower part of said partition wall and said main body to prevent air stream and water flowing down along the inner circumferential surface of said main body and the outer circumferential surface of said partition wall from swirling at the bottom of said cyclone chamber.

4. A dust collector according to claim 3, wherein said flow straightening fins extend radially and vertically.

5. A dust collector according to claim 3, wherein each of said flow straightening fins further comprises a portion that extends along the bottom surface of said main body.

6. A dust collector according to claim 1, further comprising one or more outwardly open supplemental drain openings provided at the lower part or bottom of said main body.

7. A dust collector according to claim 2, further comprising a plurality of flow straightening fins provided between the lower part of said partition wall and said main body to prevent air stream and water flowing down along the inner circumferential surface of said main body and the outer circumferential surface of said partition wall from swirling at the bottom of said cyclone chamber.

8. A dust collector according to claim 4, wherein each of said flow straightening fins further comprises a portion that extends along the bottom surface of said main body.

9. A dust collector according to claim 2, further comprising one or more outwardly open supplemental drain openings provided at the lower part or bottom of said main body.

10. A dust collector according to claim 3, further comprising one or more outwardly open supplemental drain openings provided at the lower part or bottom of said main body.

11. A dust collector according to claim 4, further comprising one or more outwardly open supplemental drain openings provided at the lower part or bottom of said main body.

12. A dust collector according to claim 5, further comprising one or more outwardly open supplemental drain openings provided at the lower part or bottom of said main body.

13. A dust collector according to claim 1 wherein said filter comprises a plurality of tubular filter elements extending in parallel within said filtration chamber.

14. A dust collector according to claim 13 wherein said filter elements each comprise a pleated filter material.

15. A dust collector according to claim 13 wherein said filter elements open into a top space within the top of said main body and further comprising a plurality of backwashing valves mounted within said top space and respectively arranged vertically above openings of the tubular filter elements.

* * * * *